(12) United States Patent
Kusens

(10) Patent No.: US 10,096,223 B1
(45) Date of Patent: Oct. 9, 2018

(54) METHOD AND PROCESS FOR DETERMINING WHETHER AN INDIVIDUAL SUFFERS A FALL REQUIRING ASSISTANCE

(71) Applicant: CERNER INNOVATION, INC., Kansas City, KS (US)

(72) Inventor: Neil Kusens, Sherman Oaks, CA (US)

(73) Assignee: Cerner Innovication, Inc., Kansas City, KS (US)

( * ) Notice: Subject to any disclaimer, the term of this patent is extended or adjusted under 35 U.S.C. 154(b) by 0 days.

(21) Appl. No.: 14/575,850

(22) Filed: Dec. 18, 2014

Related U.S. Application Data

(60) Provisional application No. 61/917,810, filed on Dec. 18, 2013.

(51) Int. Cl.
| | | |
|---|---|---|
| *G08B 23/00* | (2006.01) | |
| *G08B 21/02* | (2006.01) | |
| *H04N 7/18* | (2006.01) | |
| *G08B 25/00* | (2006.01) | |

(52) U.S. Cl.
CPC ............. *G08B 21/02* (2013.01); *G08B 25/00* (2013.01); *H04N 7/18* (2013.01)

(58) Field of Classification Search
CPC combination set(s) only.
See application file for complete search history.

(56) References Cited

U.S. PATENT DOCUMENTS

| 4,669,263 | A | 6/1987 | Sugiyama |
| 4,857,716 | A | 8/1989 | Gombrich et al. |
| 5,031,228 | A | 7/1991 | Lu |
| 5,276,432 | A | 1/1994 | Travis |
| 5,448,221 | A | 9/1995 | Weller |
| 5,482,050 | A | 1/1996 | Smokoff et al. |
| 5,592,153 | A | 1/1997 | Welling et al. |
| 5,798,798 | A | 8/1998 | Rector et al. |
| 5,838,223 | A | 11/1998 | Gallant et al. |
| 5,915,379 | A | 6/1999 | Wallace et al. |
| 5,942,986 | A | 8/1999 | Shabot et al. |

(Continued)

FOREIGN PATENT DOCUMENTS

| DE | 19844918 A1 | 4/2000 |
| WO | 2009018422 A1 | 2/2009 |
| WO | 2012122002 A1 | 9/2012 |

OTHER PUBLICATIONS

Pending U.S. Application by same inventor Neil Kusens, U.S. Appl. No. 14/084,588, filed Nov. 19, 2013, entitled "Method for Determining Whether an Individual Leaves a Prescribed Virtual Perimeter".

(Continued)

*Primary Examiner* — Travis Hunnings
(74) *Attorney, Agent, or Firm* — Shook, Hardy & Bacon, L.L.P.

(57) ABSTRACT

A system and method that allows caregivers, central monitoring companies and other persons to monitor disabled, elderly or other high-risk individuals and obtain automatic notification of falls by such an individual, including, but not limited to, falls that require assistance. One or more 3D motion and sound sensors can be placed in the monitored individual's room and provide continuous data which is analyze to determine when the individual has fallen.

20 Claims, 9 Drawing Sheets

(56) References Cited

U.S. PATENT DOCUMENTS

| | | | |
|---|---|---|---|
| 6,050,940 A | 4/2000 | Braun et al. |
| 6,095,984 A | 8/2000 | Amano et al. |
| 6,160,478 A | 12/2000 | Jacobsen et al. |
| 6,174,283 B1 | 1/2001 | Nevo et al. |
| 6,188,407 B1 | 2/2001 | Smith et al. |
| 6,269,812 B1 | 8/2001 | Wallace et al. |
| 6,287,452 B1 | 9/2001 | Allen et al. |
| 6,322,502 B1 | 11/2001 | Schoenberg et al. |
| 6,369,838 B1 | 4/2002 | Wallace et al. |
| 6,429,869 B1 | 8/2002 | Kamakura et al. |
| 6,614,349 B1 | 9/2003 | Proctor et al. |
| 6,727,818 B1 | 4/2004 | Wildman et al. |
| 6,804,656 B1 | 10/2004 | Rosenfeld et al. |
| 7,015,816 B2 | 3/2006 | Wildman et al. |
| 7,122,005 B2 | 10/2006 | Shusterman |
| 7,154,397 B2 | 12/2006 | Zerhusen et al. |
| 7,237,287 B2 | 7/2007 | Weismiller et al. |
| 7,323,991 B1 | 1/2008 | Eckert et al. |
| 7,408,470 B2 | 8/2008 | Wildman et al. |
| 7,420,472 B2 | 9/2008 | Tran |
| 7,430,608 B2 | 9/2008 | Noonan et al. |
| 7,502,498 B2 | 3/2009 | Wen et al. |
| 7,612,679 B1 | 11/2009 | Fackler et al. |
| 7,669,263 B2 | 3/2010 | Menkedick et al. |
| 7,715,387 B2 | 5/2010 | Schuman |
| 7,724,147 B2 | 5/2010 | Brown |
| 7,756,723 B2 | 7/2010 | Rosow et al. |
| 7,890,349 B2 | 2/2011 | Cole et al. |
| 7,895,055 B2 | 2/2011 | Schneider et al. |
| 7,908,153 B2 | 3/2011 | Scherpbier et al. |
| 7,945,457 B2 | 5/2011 | Zaleski |
| 7,962,544 B2 | 6/2011 | Torok et al. |
| 7,972,140 B2 | 7/2011 | Renaud |
| 8,108,036 B2 | 1/2012 | Tran |
| 8,123,685 B2 | 2/2012 | Brauers et al. |
| 8,128,596 B2 | 3/2012 | Carter |
| 8,224,108 B2 | 7/2012 | Steinberg et al. |
| 8,237,558 B2 | 8/2012 | Seyed Momen et al. |
| 8,237,018 B2 | 9/2012 | Fackler et al. |
| 8,432,263 B2 | 4/2013 | Kunz |
| 8,451,314 B1 | 5/2013 | Cline et al. |
| 8,529,448 B2 | 9/2013 | McNair |
| 8,565,500 B2 | 10/2013 | Neff |
| 8,620,682 B2 | 12/2013 | Bechtel et al. |
| 8,655,680 B2 | 2/2014 | Bechtel et al. |
| 8,700,423 B2 | 4/2014 | Eaton, Jr. et al. |
| 8,727,981 B2 | 5/2014 | Bechtel et al. |
| 8,769,153 B2 | 7/2014 | Dziubinski |
| 8,890,937 B2 | 11/2014 | Skubic et al. |
| 8,902,068 B2 | 12/2014 | Bechtel et al. |
| 8,917,186 B1 | 12/2014 | Grant |
| 8,953,886 B2 | 2/2015 | King et al. |
| 9,072,929 B1 | 7/2015 | Rush et al. |
| 9,129,506 B1 | 9/2015 | Kusens |
| 9,147,334 B2 | 9/2015 | Long et al. |
| 9,159,215 B1 | 10/2015 | Kusens |
| 9,269,012 B2 | 2/2016 | Fotland |
| 9,292,089 B1 | 3/2016 | Sadek |
| 9,305,191 B2 | 4/2016 | Long et al. |
| 9,408,561 B2 | 8/2016 | Stone et al. |
| 9,489,820 B1 | 11/2016 | Kusens |
| 9,519,969 B1 | 12/2016 | Kusens |
| 9,524,443 B1 | 12/2016 | Kusens |
| 9,536,310 B1 | 1/2017 | Kusens |
| 9,538,158 B1 | 1/2017 | Rush et al. |
| 9,563,955 B1 | 2/2017 | Kamarshi et al. |
| 9,597,016 B2 | 3/2017 | Stone et al. |
| 9,729,833 B1 | 8/2017 | Kusens |
| 9,741,227 B1 | 8/2017 | Kusens |
| 9,892,310 B2 | 2/2018 | Kusens et al. |
| 9,892,311 B2 | 2/2018 | Kusens et al. |
| 9,892,611 B1 | 2/2018 | Kusens |
| 9,905,113 B2 | 2/2018 | Kusens |
| 2002/0015034 A1 | 2/2002 | Malmborg |
| 2002/0077863 A1 | 6/2002 | Rutledge et al. |
| 2002/0101349 A1 | 8/2002 | Rojas, Jr. |
| 2002/0115905 A1 | 8/2002 | August |
| 2002/0183976 A1 | 12/2002 | Pearce |
| 2003/0037786 A1 | 2/2003 | Biondi et al. |
| 2003/0070177 A1 | 4/2003 | Kondo et al. |
| 2003/0092974 A1 | 5/2003 | Santoso et al. |
| 2003/0095147 A1 | 5/2003 | Daw |
| 2003/0135390 A1 | 7/2003 | O'Brien et al. |
| 2003/0140928 A1 | 7/2003 | Bui et al. |
| 2003/0227386 A1 | 12/2003 | Pulkkinen et al. |
| 2004/0019900 A1 | 1/2004 | Knightbridge et al. |
| 2004/0052418 A1 | 3/2004 | DeLean |
| 2004/0054760 A1 | 3/2004 | Ewing et al. |
| 2004/0097227 A1 | 5/2004 | Siegel |
| 2004/0116804 A1 | 6/2004 | Mostafavi |
| 2004/0193449 A1 | 9/2004 | Wildman et al. |
| 2005/0038326 A1 | 2/2005 | Mathur |
| 2005/0182305 A1 | 8/2005 | Hendrich |
| 2005/0231341 A1 | 10/2005 | Shimizu |
| 2005/0249139 A1 | 11/2005 | Nesbit |
| 2006/0004606 A1 | 1/2006 | Wendl |
| 2006/0047538 A1 | 3/2006 | Condurso et al. |
| 2006/0049936 A1 | 3/2006 | Collins et al. |
| 2006/0058587 A1 | 3/2006 | Heimbrock et al. |
| 2006/0089541 A1 | 4/2006 | Braun et al. |
| 2006/0092043 A1 | 5/2006 | Lagassey |
| 2006/0107295 A1 | 5/2006 | Margis et al. |
| 2006/0145874 A1* | 7/2006 | Fredriksson ......... G08B 21/043 340/573.1 |
| 2006/0261974 A1 | 11/2006 | Albert et al. |
| 2007/0085690 A1 | 4/2007 | Tran |
| 2007/0118054 A1 | 5/2007 | Pinhas et al. |
| 2007/0120689 A1 | 5/2007 | Zerhusen et al. |
| 2007/0129983 A1 | 6/2007 | Scherpbier et al. |
| 2007/0136218 A1 | 6/2007 | Bauer et al. |
| 2007/0159332 A1 | 7/2007 | Koblasz |
| 2007/0279219 A1 | 12/2007 | Warriner |
| 2007/0296600 A1 | 12/2007 | Dixon et al. |
| 2008/0001763 A1 | 1/2008 | Raja |
| 2008/0002860 A1 | 1/2008 | Super et al. |
| 2008/0004904 A1 | 1/2008 | Tran |
| 2008/0009686 A1 | 1/2008 | Hendrich |
| 2008/0015903 A1 | 1/2008 | Rodgers |
| 2008/0071210 A1 | 3/2008 | Moubayed et al. |
| 2008/0087719 A1 | 4/2008 | Sahud |
| 2008/0106374 A1 | 5/2008 | Sharbaugh |
| 2008/0126132 A1 | 5/2008 | Warner et al. |
| 2008/0228045 A1 | 9/2008 | Gao et al. |
| 2008/0249376 A1 | 10/2008 | Zaleski |
| 2008/0267447 A1 | 10/2008 | Kelusky et al. |
| 2008/0277486 A1 | 11/2008 | Seem et al. |
| 2008/0281638 A1 | 11/2008 | Weatherly et al. |
| 2009/0082829 A1 | 3/2009 | Panken et al. |
| 2009/0091458 A1 | 4/2009 | Deutsch |
| 2009/0099480 A1 | 4/2009 | Salgo et al. |
| 2009/0112630 A1 | 4/2009 | Collins, Jr. et al. |
| 2009/0119843 A1 | 5/2009 | Rodgers et al. |
| 2009/0177327 A1 | 7/2009 | Turner et al. |
| 2009/0224924 A1 | 9/2009 | Thorp |
| 2009/0278934 A1 | 11/2009 | Ecker et al. |
| 2009/0322513 A1 | 12/2009 | Hwang et al. |
| 2010/0117836 A1 | 5/2010 | Seyed Momen et al. |
| 2010/0169114 A1 | 7/2010 | Henderson et al. |
| 2010/0169120 A1 | 7/2010 | Herbst et al. |
| 2010/0172567 A1 | 7/2010 | Prokoski |
| 2010/0176952 A1 | 7/2010 | Bajcsy et al. |
| 2010/0188228 A1 | 7/2010 | Hyland |
| 2010/0205771 A1 | 8/2010 | Pietryga et al. |
| 2010/0245577 A1 | 9/2010 | Yamamoto et al. |
| 2010/0285771 A1 | 11/2010 | Peabody |
| 2010/0305466 A1 | 12/2010 | Corn |
| 2011/0018709 A1 | 1/2011 | Kombluh |
| 2011/0022981 A1 | 1/2011 | Mahajan et al. |
| 2011/0025493 A1 | 2/2011 | Papadopoulos et al. |
| 2011/0025499 A1 | 2/2011 | Hoy et al. |
| 2011/0035057 A1 | 2/2011 | Receveur et al. |
| 2011/0035466 A1 | 2/2011 | Panigrahi |
| 2011/0054936 A1 | 3/2011 | Cowan et al. |
| 2011/0068930 A1 | 3/2011 | Wildman et al. |

(56) References Cited

U.S. PATENT DOCUMENTS

| | | |
|---|---|---|
| 2011/0077965 A1 | 3/2011 | Nolte et al. |
| 2011/0087079 A1 | 4/2011 | Aarts |
| 2011/0087707 A1 | 4/2011 | Aarts |
| 2011/0102133 A1 | 5/2011 | Shaffer |
| 2011/0102181 A1 | 5/2011 | Metz et al. |
| 2011/0106560 A1 | 5/2011 | Eaton, Jr. et al. |
| 2011/0106561 A1 | 5/2011 | Eaton, Jr. et al. |
| 2011/0175809 A1 | 7/2011 | Markovic et al. |
| 2011/0190593 A1 | 8/2011 | McNair |
| 2011/0227740 A1 | 9/2011 | Wohltjen |
| 2011/0254682 A1 | 10/2011 | Sigrist |
| 2011/0288811 A1 | 11/2011 | Greene |
| 2011/0295621 A1 | 12/2011 | Farooq et al. |
| 2011/0301440 A1 | 12/2011 | Riley et al. |
| 2011/0313325 A1 | 12/2011 | Cuddihy |
| 2012/0025991 A1 | 2/2012 | O'Keefe et al. |
| 2012/0026308 A1 | 2/2012 | Johnson et al. |
| 2012/0075464 A1 | 3/2012 | Derenne et al. |
| 2012/0092162 A1 | 4/2012 | Rosenberg |
| 2012/0098918 A1* | 4/2012 | Murphy ............... H04N 7/147 348/14.01 |
| 2012/0154582 A1 | 6/2012 | Johnson et al. |
| 2012/0212582 A1 | 8/2012 | Deutsch |
| 2012/0259650 A1 | 10/2012 | Mallon et al. |
| 2013/0027199 A1 | 1/2013 | Bonner |
| 2013/0120120 A1 | 5/2013 | Long et al. |
| 2013/0122807 A1 | 5/2013 | Tenarvitz et al. |
| 2013/0184592 A1 | 7/2013 | Venetianer et al. |
| 2013/0309128 A1 | 11/2013 | Voegeli et al. |
| 2013/0332184 A1 | 12/2013 | Burnham et al. |
| 2014/0039351 A1 | 2/2014 | Mix et al. |
| 2014/0070950 A1 | 3/2014 | Snodgrass |
| 2014/0085501 A1 | 3/2014 | Tran |
| 2014/0155755 A1 | 6/2014 | Pinter et al. |
| 2014/0191861 A1 | 7/2014 | Scherer |
| 2014/0267625 A1 | 9/2014 | Clark et al. |
| 2014/0327545 A1 | 11/2014 | Bolling et al. |
| 2014/0333744 A1 | 11/2014 | Baym et al. |
| 2014/0354436 A1 | 12/2014 | Nix et al. |
| 2014/0365242 A1 | 12/2014 | Neff |
| 2015/0109442 A1 | 4/2015 | Derenne et al. |
| 2015/0206415 A1 | 7/2015 | Wegelin et al. |
| 2015/0269318 A1 | 9/2015 | Neff |
| 2015/0278456 A1 | 10/2015 | Bermudez Rodriguez et al. |
| 2016/0022218 A1 | 1/2016 | Hayes et al. |
| 2016/0070869 A1 | 3/2016 | Portnoy |
| 2016/0093195 A1 | 3/2016 | Ophardt |
| 2016/0127641 A1 | 5/2016 | Gove |
| 2016/0253802 A1 | 9/2016 | Venetianer et al. |
| 2016/0267327 A1 | 9/2016 | Franz et al. |
| 2017/0055917 A1 | 3/2017 | Stone et al. |
| 2017/0109991 A1 | 4/2017 | Kusens |
| 2017/0143240 A1 | 5/2017 | Stone et al. |

OTHER PUBLICATIONS

Pending U.S. Application by same inventor Neil Kusens, U.S. Appl. No. 14/599,498, filed Jan. 17, 2015, entitled "Method and System for Determining Whether an Individual Takes Appropriate Measures to Prevent the Spread of Healthcare Associated Infections".

Pending U.S. Application by same inventor Neil Kusens, U.S. Appl. No. 14/611,363, filed Feb. 2, 2015, entitled "Method and System for Determining Whether an Individual Takes Appropriate Measures to Prevent the Spread of Healthcare Associated Infections ".

Pending U.S. Application by same inventor Neil Kusens, U.S. Appl. No. 14/613,866, filed Feb. 4, 2015, entitled "Method and System for Determining Whether an Individual Takes Appropriate Measures to Prevent the Spread of Healthcare Associated Infections Along With Centralized Monitoring".

Pending U.S. Application by same inventor Neil Kusens, U.S. Appl. No. 14/724,969, filed May 29, 2015, entitled "Method and Process for Determining Whether an Individual Suffers a Fall Requiring Assistance".

Pending U.S. Application by same inventor Neil Kusens, U.S. Appl. No. 13/543,816, filed Jul. 7, 2012, entitled "Method and Process for Determining Whether an Individual Suffers a Fall Requiring Assistance".

Pending U.S. Application by same inventor Neil Kusens, U.S. Appl. No. 14/727,434, filed Jun. 1, 2015, entitled Method for Determining Whether Enters a Prescribed Virtual Zone Using Skeletal Tracking and 3D Blob Detection.

Pending U.S. Application by same inventor Neil Kusens, U.S. Appl. No. 14/728,762, filed Jun. 2, 2015, entitled "Method for Determining Whether an Individual Leaves a Prescribed Virtual Perimeter".

Pending U.S. Application by same inventor Neil Kusens, U.S. Appl. No. 14/743,264, filed Jun. 18, 2015, entitled "System for Determining Whether an Individual Enters a Prescribed Virtual Zone Using 3D Blob Detection".

Pending U.S. Application by same inventor Neil Kusens, U.S. Appl. No. 14/743,499, filed Jun. 18, 2015, entitled "System for Determining Whether an Individual Suffers a Fall Requiring Assistance".

Pending U.S. Application by same inventor Neil Kusens, U.S. Appl. No. 14/743,447, filed Jun. 18, 2015, entitled "System for Determining Whether an Individual Suffers a Fall Requiring Assistance".

Notice of Allowance dated Aug. 26, 2016 in U.S. Appl. No. 14/743,447, 5 pages.

Notice of Allowance dated Sep. 19, 2016 in U.S. Appl. No. 14/743,499, 5 pages.

Notice of Allowance dated Oct. 14, 2016 in U.S. Appl. No. 14/743,264, 14 pages.

Notice of Allowance dated Nov. 9, 2016 in U.S. Appl. No. 14/743,264, 14 pages.

Notice of Allowance dated Nov. 14, 2016 in U.S. Appl. No. 14/743,447, 5 pages.

Notice of Allowance dated Dec. 23, 2016 in U.S. Appl. No. 14/724,969, 5 pages.

Non-Final Office Action dated Jan. 11, 2017 in U.S. Appl. No. 14/611,363, 19 pages.

Non-Final Office Action dated Feb. 23, 2017 in U.S. Appl. No. 14/757,877, 24 pages.

First Action Interview Preinterview Communication dated Feb. 24, 2017 in U.S. Appl. No. 15/395,716, 5 pages.

Notice of Allowance dated Mar. 20, 2017 in U.S. Appl. No. 14/613,866, 11 pages.

Non-Final Office Action dated Apr. 5, 2017 in U.S. Appl. No. 14/613,866, 15 pages.

Non-Final Office Action dated Aug. 16, 2017 in U.S. Appl. No. 14/757,593, 8 pages.

Final Office Action dated Aug. 23, 2017 in U.S. Appl. No. 15/285,416, 16 pages.

Notice of Allowance dated Sep. 21, 2017 in U.S. Appl. No. 15/395,526, 13 pages.

Notice of Allowance dated Sep. 26, 2017 in U.S. Appl. No. 15/395,250, 13 pages.

Final Office Action dated Sep. 29, 2017 in U.S. Appl. No. 14/757,877, 22 pages.

Final Office Action dated Oct. 4, 2017 in U.S. Appl. No. 14/623,349, 30 pages.

Notice of Allowance dated Oct. 10, 2017 in U.S. Appl. No. 14/727,434, 9 pages.

Final Office Action dated Oct. 12, 2017 in U.S. Appl. No. 14/599,498, 28 pages.

Notice of Allowance dated Oct. 20, 2017 in U.S. Appl. No. 15/279,054, 14 pages.

Pending U.S. Application by same inventor Neil Kusens, U.S. Appl. No. 14/623,349, filed Feb. 16, 2015, entitled "Method for Determining Whether an Individual Enters a Prescribed Virtual Zone Using 3D Blob Detection".

Non-Final Office Action dated Sep. 23, 2016 in U.S. Appl. No. 14/727,434, 9 pages.

Non-Final Office Action dated Apr. 11, 2017 in U.S. Appl. No. 15/285,416, 13 pages.

Notice of Allowance dated Apr. 19, 2017 in U.S. Appl. No. 15/395,716, 5 pages.

Non-Final Office Action dated Apr. 21, 2017 in U.S. Appl. No. 14/757,593, 9 pages.

(56) References Cited

OTHER PUBLICATIONS

Notice of Allowance dated Apr. 21, 2017 in U.S. Appl. No. 14/724,969, 9 pages.
Notice of Allowance dated Apr. 25, 2017 in U.S. Appl. No. 14/727,434, 9 pages.
Final Office Action dated Apr. 28, 2017 in U.S. Appl. No. 14/611,363, 20 pages.
Non-Final Office Action dated May 31, 2017 in U.S. Appl. No. 14/599,498, 24 pages.
Notice of Allowance dated Jul. 5, 2017 in U.S. Appl. No. 14/727,434, 9 pages.
Non-Final Office Action dated Apr. 27, 2017 in U.S. Appl. No. 15/395,526, 16 pages.
Non-Final Office Action dated May 8, 2017 in U.S. Appl. No. 15/395,250, 19 pages.
Notice of Allowance dated Jul. 24, 2017 in U.S. Appl. No. 15/395,716, 5 pages.
Non-Final Office Action dated Oct. 7, 2015 in U.S. Appl. No. 14/339,397, 16 pages.
Notice of Allowance dated Jun. 5, 2015 in U.S. Appl. No. 13/543,816, 5 pages.
Non-Final Office Action dated Feb. 11, 2016 in U.S. Appl. No. 14/724,969, 14 pages.
Non-Final Office Action dated May 23, 2016 in U.S. Appl. No. 14/743,499, 5 pages.
Notice of Allowance dated May 31, 2016 in U.S. Appl. No. 14/743,447, 8 pages.
Notice of Allowance dated Jun. 22, 2016 in U.S. Appl. No. 14/743,447, 4 pages.
Notice of Allowance dated Jun. 27, 2016 in U.S. Appl. No. 14/728,762, 14 pages.
Notice of Allowance dated Jul. 18, 2016 in U.S. Appl. No. 14/743,264, 16 pages.
Final Office Action dated Jul. 28, 2016 in U.S. Appl. No. 14/723,969, 26 pages.
Tom Mooney, "Rhode Island ER first to test Google Glass on medical conditions", http://www.ems1.com/ems-products/cameras-video/articles/1860487-Rhode-Island-ER-first. . . printed on Mar. 11, 2014.
Pending U.S. Application by same inventor Neal Kusens, U.S. Appl. No. 14/613,866, filed Feb. 4, 2015, entitled "Method and System for Determining Whether an Individual Takes Appropriate Measures to Prevent the Spread of Healthcare Associated Infections Along With Centralized Monitoring".
Pending U.S. Application by same inventor Neal Kusens. U.S. Appl. No. 14/611,363, filed Feb. 2, 2015, entitled "Method and System for Determining Whether an Individual Takes Appropriate Measures to Prevent the Spread of Healthcare Associated Infections ".
Raheja, et al., "Human Facial Expression Detection From Detected in CapturedImage Using Back Propagation Neural Network" , International Journal of Computer Science and Information Technology (IJCSIT), vol. 2, No. 1, Feb. 2010, 8 pages.
Final Office Action dated Oct. 18, 2017 in U.S. Appl. No. 15/396,263, 20 pages.
First Action Interview Office Action dated Nov. 28, 2017 in U.S. Appl. No. 14/244,160, 3 pages.
Non-Final Office Action dated Apr. 14, 2017 in U.S. Appl. No. 15/396,263, 18 pages.
Notice of Allowance dated Nov. 27, 2017 in U.S. Appl. No. 15/279,054, 2 pages.
Final Office Action dated Feb. 16, 2018 in U.S. Appl. No. 14/757,593, 8 pages.
First Action Interview Office Action dated Feb. 22, 2018 in U.S. Appl. No. 15/134,189, 4 pages.
Non-Final Office Action dated Feb. 22, 2018 in U.S. Appl. No. 14/599,498, 24 pages.
Non-Final Office Action dated Feb. 7, 2018 in U.S. Appl. No. 15/396,263, 19 pages.
Non-Final Office Action dated Mar. 12, 2018 in U.S. Appl. No. 15/285,416, 20 pages.
Non-Final Office Action dated May 2, 2018 in U.S. Appl. No. 15/728,110, 8 pages.
Non-Final Office Action dated May 7, 2018 in U.S. Appl. No. 14/611,363, 6 pages.
Non-Final Office Action dated May 8, 2018 in U.S. Appl. No. 15/148,151, 5 pages.
Notice of Allowance dated Feb. 12, 2018 in U.S. Appl. No. 14/623,349, 12 pages.
Notice of Allowance dated Jan. 18, 2018 in U.S. Appl. No. 15/279,054, 2 pages.
Notice of Allowance dated May 9, 2018 in U.S. Appl. No. 15/395,716, 5 pages.
Non-Final Office Action dated Dec. 30, 2013 in U.S. Appl. No. 13/543,816, 9 pages.
Final Office Action dated Jun. 17, 2014 in U.S. Appl. No. 13/543,816, 15 pages.
Non-Final Office Action dated Jul. 16, 2014 in U.S. Appl. No. 14/084,588, 12 pages.
Non-Final Office Action dated Dec. 1, 2014 in U.S. Appl. No. 13/543,816, 18 pages.
Final Office Action dated Dec. 19, 2014 in U.S. Appl. No. 14/084,588, 24 pages.
First Action Interview Pre-Interview Communication dated Nov. 22, 2017 in U.S. Appl. No. 15/134,189, 4 pages.
Notice of Allowance dated Dec. 6, 2017 in U.S. Appl. No. 15/395,716, 5 pages.
Final Office Action dated Dec. 12, 2017 in U.S. Appl. No. 14/575,850, 10 pages.
Notice of Allowance dated Dec. 29, 2017 in U.S. Appl. No. 14/611,363, 11 pages.
Non-Final Office Action dated Mar. 14, 2018 in U.S. Appl. No. 14/757,877, 13 pages.
First Action Interview Pre-Interview Communication dated May 21, 2018 in U.S. Appl. No. 15/910,645, 14 pages.
Non-Final Office Action dated Jun. 8, 2018 in U.S. Appl. No. 15/628,318, 9 new pages.
Non-Final Office Action dated May 31, 2018 in U.S. Appl. No. 15/395,762, 24 pages.
Non-Final Office Action dated May 31, 2018 in U.S. Appl. No. 15/848,621, 23 pages.
Notice of Allowance dated Jun. 18, 2018 in U.S. Appl. No. 14/623,349, 11 pages.
Notice of Allowance dated Jun. 19, 2018 in U.S. Appl. No. 15/395,716, 2 pages.
Notice of Allowance dated Jun. 4, 2018 in U.S. Appl. No. 14/757,593, 5 pages.
Final Office Action dated Jul. 5, 2018 in U.S. Appl. No. 15/285,416, 8 pages.
Final Office Action dated Jul. 12, 2018 in U.S. Appl. No. 15/134,189, 23 pages.
Notice of Allowance dated Jul. 13, 2018 in U.S. Appl. No. 15/396,263, 9 pages.
Notice of Allowance dated Jul. 18, 2018 in U.S. Appl. No. 14/599,498, 6 pages.
Notice of Allowance dated Jul. 23, 2018 in U.S. Appl. No. 15/728,110, 15 pages.
Non-Final Office Action dated Aug. 15, 2018 in U.S. Appl. No. 15/910,632, 7 pages.

* cited by examiner

FIGURE 1: Diagnosis Determination
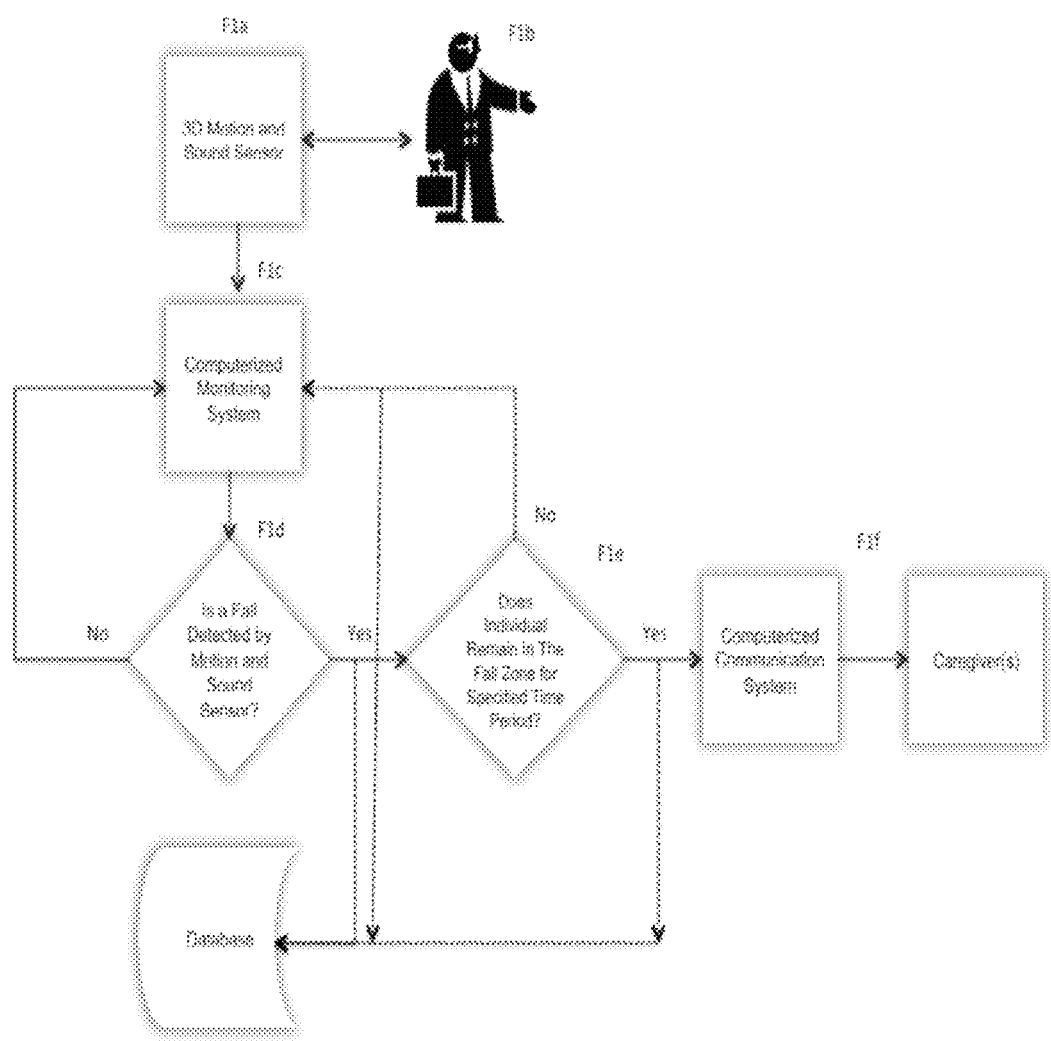

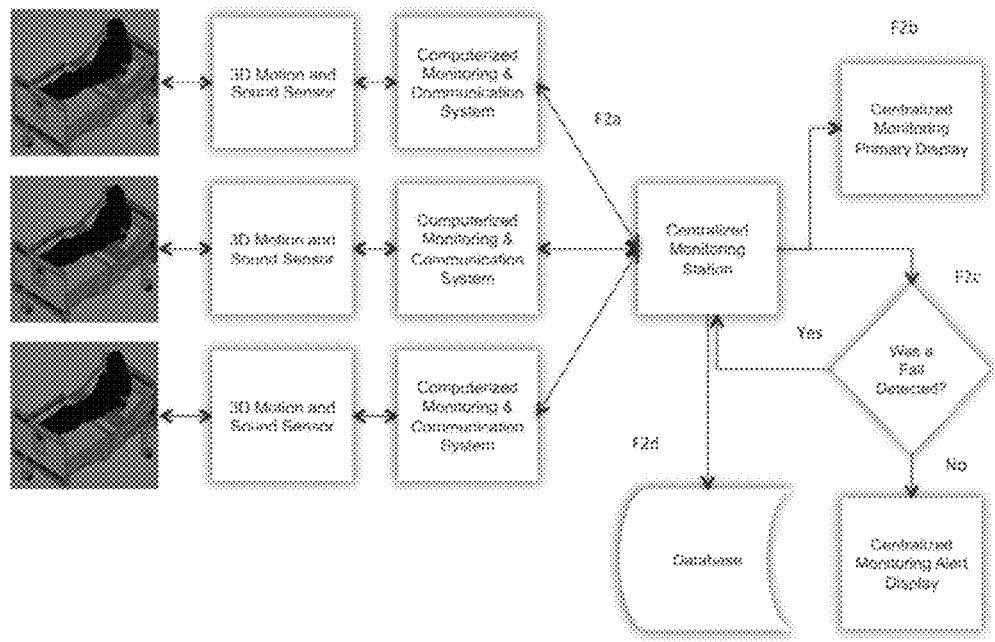
FIGURE 2: Centralized Monitoring and Alerting
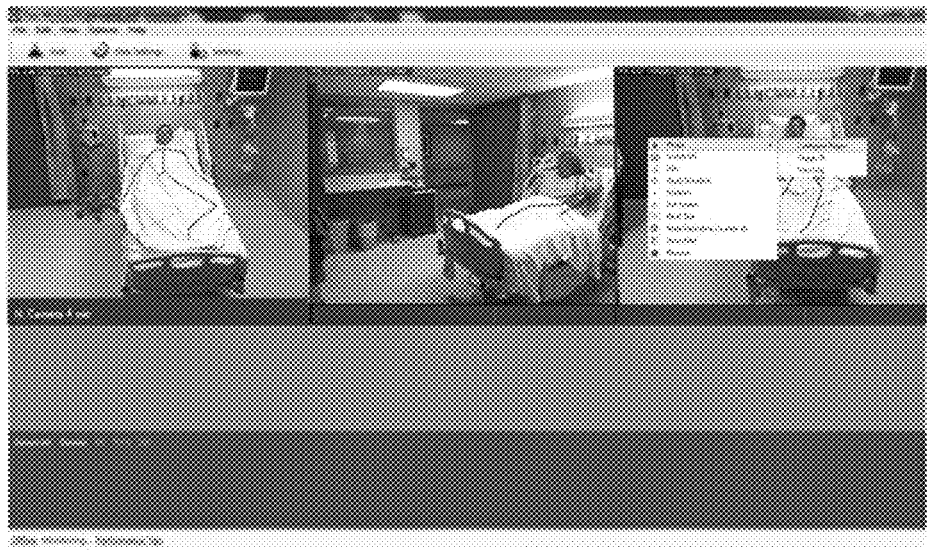
FIGURE 3

- Bed Zone

- Auto Bed Zone (Select Patient)

- Auto Bed Zone (Auto-select)

- Saved Zones

- Fall Zone

- Clear All

METHOD AND PROCESS FOR DETERMINING WHETHER AN INDIVIDUAL SUFFERS A FALL REQUIRING ASSISTANCE

This application claims priority to and the benefit of U.S. Application Ser. No. 61/917,810, filed on Dec. 18, 2013, which application is incorporated by reference in its entirety.

1. BACKGROUND

According to recent studies, one out of three adults age 65 and older falls each year with that risk increasing proportionately with age. For adults age 80, one in two will fall each year. These falls are the leading cause of injury related death among those age 65 and older and account for 87% of all fractures for those in this age group. Additionally, for those who fall and are unable to get up on their own, the length of time spent immobile can affect their prognosis. Within 30 to 60 minutes of the fall, compression causes muscle cells to begin breaking down. Other complications include, but are not limited to, dehydration, pressure sores, hypothermia and pneumonia. Even if the fall does not result in injury to the individual, 47% of non-injured fallers cannot get up without assistance.

2. SUMMARY AND DEFINITIONS

The disclosure is directed to the above problems and provides for a system and method that allows caregivers, central monitoring companies and other persons to monitor disabled, elderly or other high-risk individuals and obtain automatic notification of falls by such an individual, including, but not limited to, falls that require assistance.

Non-limiting definitions that will be used in describing certain embodiments of the disclosure include:

| | |
|---|---|
| 3D Motion and Sound Sensor | An electronic device that contains one or more cameras capable of identifying individual objects, people and motion regardless of lighting conditions as well as one or more microphones to detect audio. The cameras can utilize technologies including but not limited to color RGB, CMOS sensors, infrared projectors and RF-modulated light. They may also contain microprocessors and image sensors to detect and process information both sent out and received by the various cameras.<br>The electronic device calculates if there has been a change in location of the person or object of interest over a period of time. As a non-limiting example, a person's right knee can be at time T1 located at coordinates (x1, y1, z1) in a picture frame taken by the camera. At time T2 the right knee is capture by the picture frame taken by the camera at coordinates (x2, y2, z2). Based on this information, motion, speed and direction can be derived utilizing the elapsed time and comparing the two 3D coordinates over the elapsed time. As opposed to conventional motion sensors, which use captured motion to control a camera, the 3D Motion and Sound Sensor used with the method and system, uses the camera in order to compute the motion. The camera/sensors are preferably continuously on at all times while the monitoring is occurring, regardless of whether the person or object of interest is moving or not. The camera preferably views the entire room or a large portion of the room simply by its placement in a manner sufficient for the room to be visible to the camera.<br>Preferably the 3D Motion and Sound Sensor records video. As video is technically made up of individual picture frames (i.e. 30 frames per second of video), the above reference to picture frames is referring to frames of video.<br>The 3D Motion and Sound Sensor is located within the room of the patient being monitored and potentially just outside of the patient's room, it is connected to the computerized communication and computerized monitoring, systems via a data connection (TCP/IP or comparable technology). |
| Computerized Monitoring System | A computer system programmed to monitor activity of the 3D Motion and Sound sensor, The computerized monitoring system will preferably be located within the patient's room and can be connected to the centralized monitoring station at the facility but can also be located at any physical location so long as a data connection (TCP/IP or comparable technology) exists between the computerized monitoring system, the computerized communication system, centralized monitoring station and 3D motion and sound sensor. The computerized monitoring system preferably makes the determination of a fall based on the data received by the video camera sensors. |
| Computerized Communication System | A computer system programmed to facilitate communication between the patient and the computerized monitoring system in the event a fall is detected. This system may include but is not limited to amplified speakers, microphones, lights, monitors, computer terminals, mobile phones and or other technologies to allow for the electronic communication to take place. The computerized communication system will preferably be located within the patients room being monitored but certain components of the system are mobile by their nature (i.e. mobile phones, pagers, computers) and can also be located at any location so long as a data connection (TCP/IP or comparable technology) exists between the computerized monitoring system, the computerized communication system, centralized monitoring station and 3D motion and sound sensor. |

| | |
|---|---|
| Centralized Monitoring Primary Display | A computer display connected to the centralized monitoring station, showing video and audio of all patient rooms connected to the centralized monitoring station. |
| Centralized Monitoring Alert Display | A computer display connected to the centralized monitoring station, showing video and audio of any patient room where an individual in such room is deemed to have fallen preferably virtually at the moment such determination is made. |
| Fall Zone | A virtual zone within the area being monitored for falls, usually within close proximity to the floor. |
| System Database | A computer database that electronically stores records of all alerts generated, confirmation requests, responses, and reconfirmation requests. |
| Caregiver | A relative, friend, individual, company or facility whose purpose is to provide assistance in the care of daily -living activities for individuals who are disabled, injured, elderly or otherwise in need of assistance. |

3. BRIEF DESCRIPTION OF THE DRAWINGS

FIG. 1 is a flow chart illustrating a diagnosis determination in accordance with the disclosure;

FIG. 2 is a block diagram of the centralizing monitoring and alerting system in accordance with the disclosure;

Figure 16:
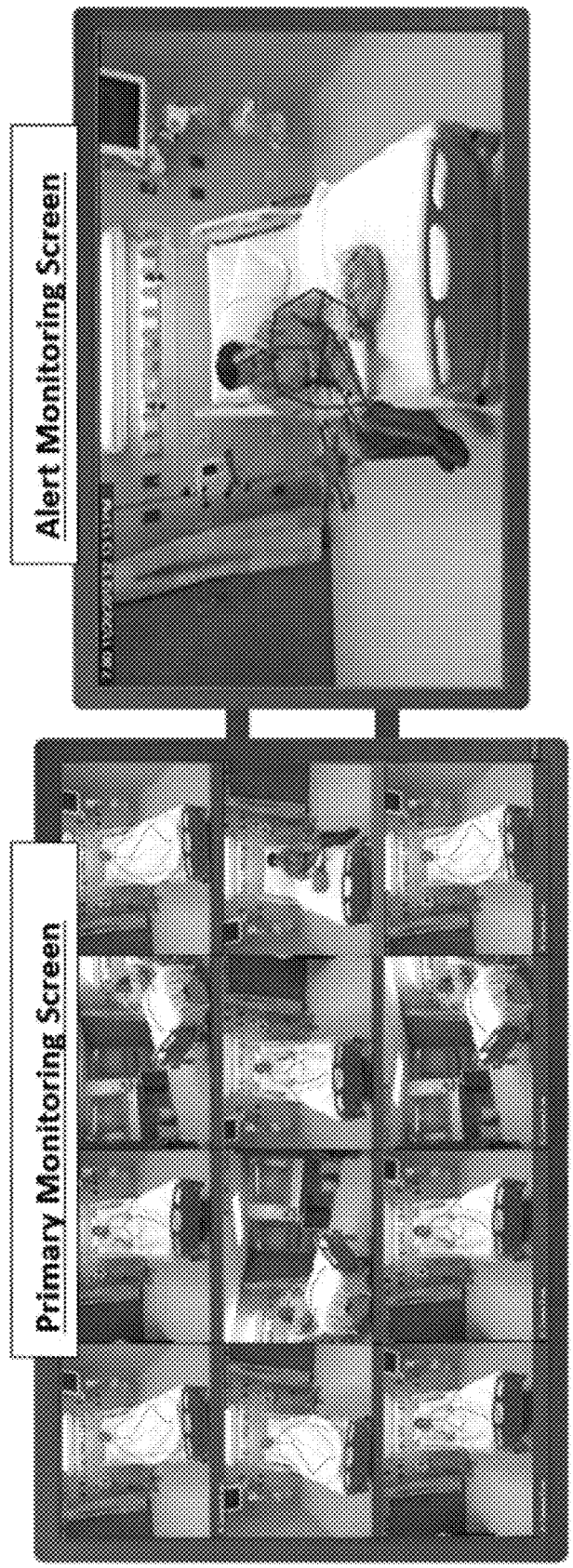

FIGS. 3 though 15 illustrate various screen shots for configuring the system for operation including defining fall zone and alert types;

FIG. 16 illustrates the centralized monitoring station with primary and alert displays.

4. DETAILED DESCRIPTION OF DRAWINGS

FIG. 1 is an overview of a diagnosis determination and shows the workflow for monitoring an individual's status through the use of one or more 3D Motion and Sound sensors. At step F1a, one or more 3D Motion and Sound sensors can be installed in living and rest room areas of the monitored individual's room, home, hospital room, or other place of temporary or permanent residence. At step F1b, the one or more 3D Motion and Sound sensors can be configured to recognize the individual and other individuals using biometric identifiers such as facial recognition, height, distance between points on the body, etc. Alternatively the patient can be identified by means of a user creating a three-dimensional zone around the patient through a software application.

At step F1c, data from the preferably one or more "continuously on" 3D Motion and Sound sensors are electronically sent to a computerized monitoring system. At step F1d, if the computerized monitoring system detects a fall based on configurable and specific segments of an individual's body entering a defined fall zone, it will electronically alert the computerized communication system. The computerized monitoring system receives the raw data from the camera sensor and makes the determination of a fall based on such data. The 3D Motion and Sound sensor can be programmed to lock on the individual (i.e. skeleton lock) and can send back to the computerized monitoring system the 3D coordinates of the joints in the individual's body and a skeletal outline of the person. The system is also able to recognize gestures such as waving a hand, rubbing hands together, etc. and uses the information received from the 3D Motion and Sound Sensor to determine if the individual is in the fall zone, how long any given body segment or joint has been in that zone and what if any gestures the individual is doing.

Where the locations to be monitored are outside of a single room one or more additional 3D Motion and Sound sensors can be positioned and configured in order to determine (capture) whether the individual has fallen as described above. This captured video can also be stored and/or reviewed by the Computerized Monitoring System when the system makes its determination. Adding one or more additional 3D Motion and Sound sensors in multiple rooms also allows the system to recognize falls in a larger area such as an individual's residence.

A record can also be electronically entered in a database to record the incident. If no fall is detected, the computerized monitoring system will continually monitor the data being sent from the one or more 3D motion and sound sensors. Additionally, where a fall is detected, the computerized monitoring system can be programmed to automatically begin, or manually restarted to begin, again monitoring data from the one or more 3D motion and sound sensors.

At step F1e, the computerized monitoring system will monitor the length of time that the configurable and specific segments of the individual's body remain in the fall zone. If those body segments remain in the fall zone for greater then a specified time period (ex. 3 seconds) then notification is electronically sent by the Computerized Communication System to the Caregivers as shown in step F1f. Should the body segments of the fallen individual exit the fall zone within the specified time period, the computerized monitoring system will continue to monitor the data being sent from the one or more 3D motion and sound sensors. The present invention is not limited to any specific time period for the fallen individual's body segments to remain in the fall zone and values below and above 3 seconds can also be used and are considered within the scope of the invention.

At step F1f, if the individual's specified body segments remain in the fall zone for a time period greater then specified, predetermined or programmed/stored, the computerized communication system will notify caregivers or other designated persons that the individuals requires assistance. Notification of caregivers can be made through phone call, text messaging, speakerphone systems, email, or other electronic means of communication. The system database can also be electronically updated to reflect actions taken.

FIG. 2 illustrates a block diagram for centralized monitoring and alerting and shows the workflow for centralized monitoring and alerting of the central monitoring regarding whether an individual has fallen through the use of 3D Motion and Sound sensors. At step F2a, one or more 3D Motion and Sound sensors are installed in and/or just outside an individual's room, home, hospital room, or other place of temporary or permanent residence and connected to the computerized monitoring and communication systems as described in FIG. 1. The video, audio and alert data can be sent to a centralized monitoring station where the data is aggregated. The computerized monitoring system receives the raw data from the sensors, runs all of the skeletal recognition and fall detection and then sends the audio video and alert data to the centralized monitoring station. The centralized monitoring station receives and displays this data from one more sensors/computerized monitoring systems. Similar to a grid of cameras being watched on a screen (i.e. where a plurality of camera feeds are viewed on a single screen), the centralized monitoring station aggregates the various video feeds, as it receives and displays information from multiple cameras.

Preferably, the centralized monitoring station receives data at all times from the sensors to allow the various individuals to be constantly monitored at the centralized station regardless of whether or not a fall has been detected.

At step F2b, all video, audio and alert feeds received by the centralized monitoring station can be displayed on the centralized monitoring primary display. Alternatively, multiple centralized monitoring primary displays can be utilized based on the quantity of rooms to be monitored at a given time. At step F2c, when the centralized monitoring system receives an alert from any of the computerized monitoring and communication systems indicating that an individual in any of the monitored rooms or other locations has fallen, the video, audio and alert information is displayed on the Centralized Monitoring Alert Display.

An alert can be represented in one or more different types of physical configurations. It can be a visual queue on screen at the Centralized monitoring system such as the specific camera view flashing or being highlighted in a color to draw attention to it (See FIG. 16). It can be an audible sound (voice or alarm type sound) at the centralized monitoring station, an audible sound at the computerized monitoring system attached to the camera sensor, a text message, an email, turning on a light or even running a program on a computer.

Should the centralized monitoring station receive alerts from more then one of the computerized monitoring and communication systems indicating that an individual in a monitored room or location has fallen, the centralized monitoring alert display will display the video, audio and alerting information from all such instances at the same time. If no alert is received by the centralized monitoring station, nothing is displayed on the Centralized Monitoring Alert Display. Preferably, all patient rooms are displayed and visible on the central monitoring primary display (FIG. 16) whether alerting or not. When an alert is generated, attention is drawn to the particular camera and a duplicative display of the alerting camera can be displayed on a second separate computer monitor (i.e. centralized monitoring alert display) (See FIG. 16). At step F2d, an electronic record of any alerts received by the Centralized Monitoring Station can be stored in an electronic database, which is in communication with the Centralized Monitoring Station.

FIGS. 3 through 15 illustrate several set up screen shots for configuring the fall zone and alert types. In FIG. 3, the bed and fall zone can be configured for a given or specific 3D Motion and Sound Sensor. To begin configuration, the user can hover over the 3D Motion and Sound Sensor video window with the cursor, right-click, select plugin and then select configure plug-in. A window will popup showing the 3D Motion and Sound Sensors' feed. The user selects the icon for the type of zone they wish to draw, which as a non-limiting example and illustrative purposes, can be a bed zone and fall zone (See FIG. 4).

Figures 4, 5:
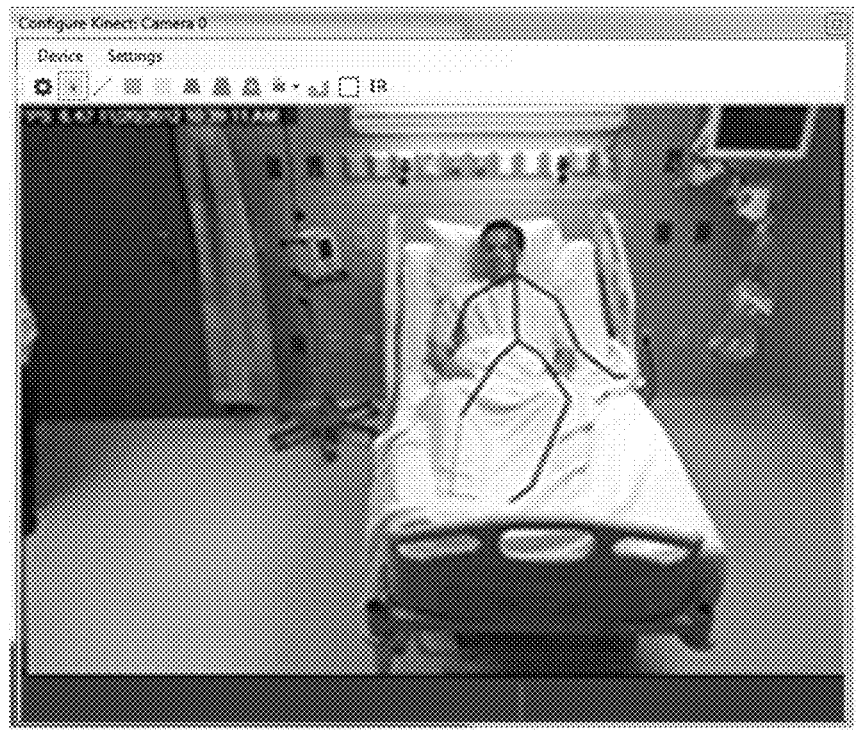

As non-limiting examples, the icons that appear on the screen for selection can include the following symbols shown in FIG. 5. In this non-limiting example, in no particular order, some of the icons include, Bed Zone, Auto Bed Zone (Select Patient), Auto Bed Zone (Auto-select), Saved Zones, Fall Zone and Clear All.

Figure 6:
Figure 8:
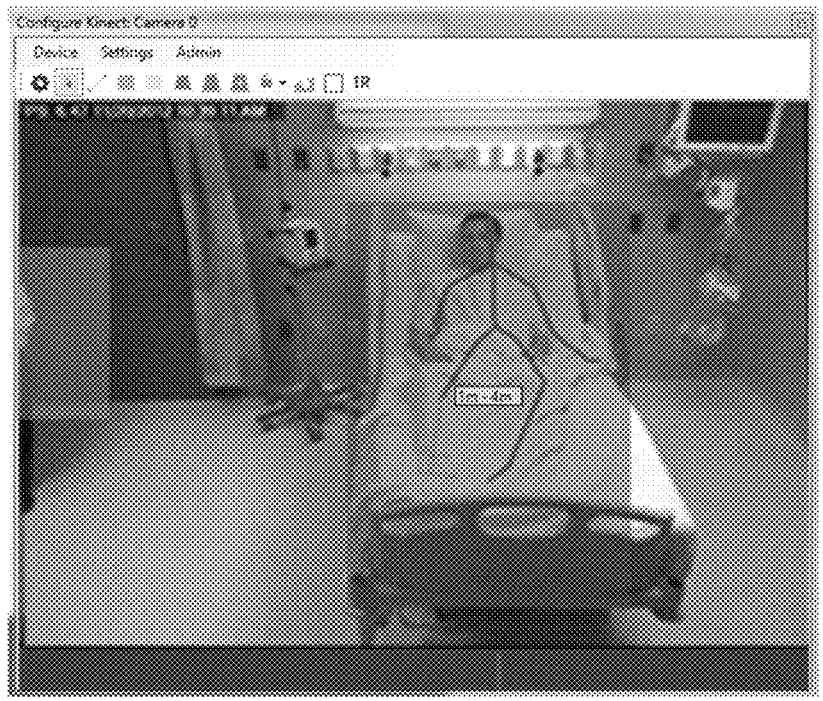

As seen in FIG. 6, to place a zone, the user clicks on the screen where he or she would like to start the zone. Then, the cursor is moved to the corner point for zone and clicked again. The user continues to select additional points until the zone is drawn to the user's satisfaction. Preferably, the user clicks on the round end point of the beginning of the zone to complete the zone (See FIG. 6). When the zone has been completed, the zone can appear and a depth range box (i.e. square, rectangle, etc. disposed over the patient on the screen) can be provided on the screen, such as, but not limited to, in the middle of the screen or zone (see FIG. 8), though any location on the screen is considered within the scope of the invention. As seen in FIG. 8, upon completion the zone appears and has a depth range box preferably in the middle.

Figure 7:
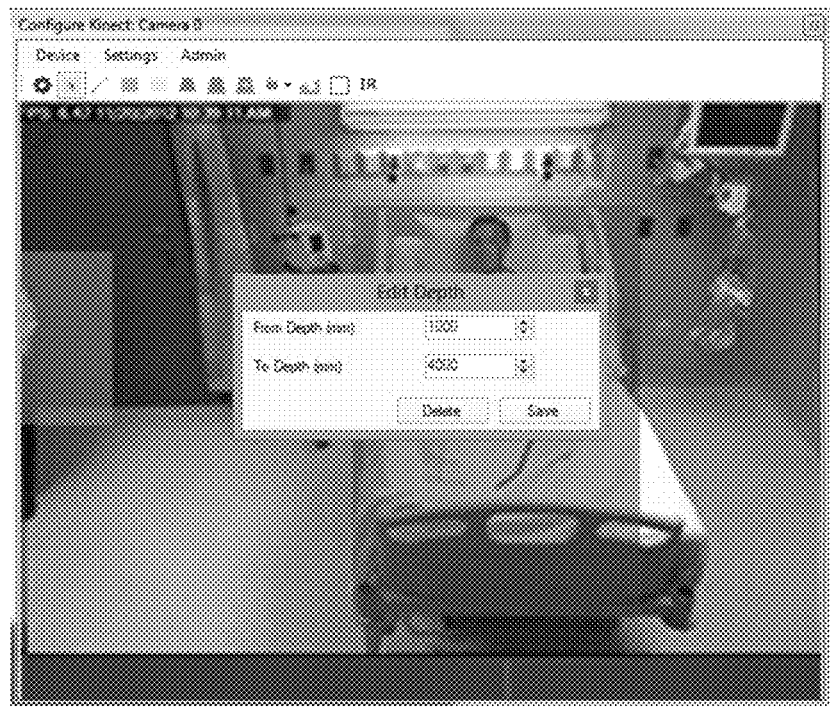

As seen in FIG. 7, the user can adjust the depth range for any given zone. By preferably double clicking on the depth range box or by other conventional selection methods an Edit Depth window can appear. The user can enter in the depth ranges (preferably in millimeters (mm) though not considered limiting) and then the user can click Save button or icon when done to store the entered values.

If there are any other types of zones to draw for the particular sensor, the above steps are repeated to place the next zone and the depth setting can be adjusted for each if necessary. Additionally, all zones can be cleared by clicking on or otherwise selecting the Clear All icon in the toolbar. Once all of the zones/wires are configured, you can close the window to finish or you have the option to save the zone configuration for later use.

Figure 9:

As seen in FIG. 9, to access the main settings window, the user can click or otherwise select the Settings menu and the select Main Settings from the drop-down list. As one non-limiting alternative, the user can click on the Gear icon ( ✱ ) or other designated icon in the toolbar to access the main settings window.

Figure 10:
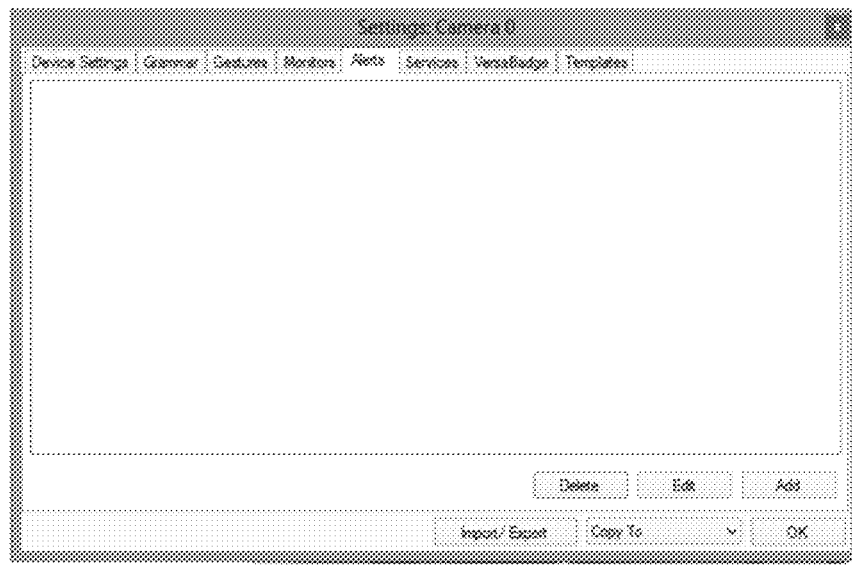
Figure 11:
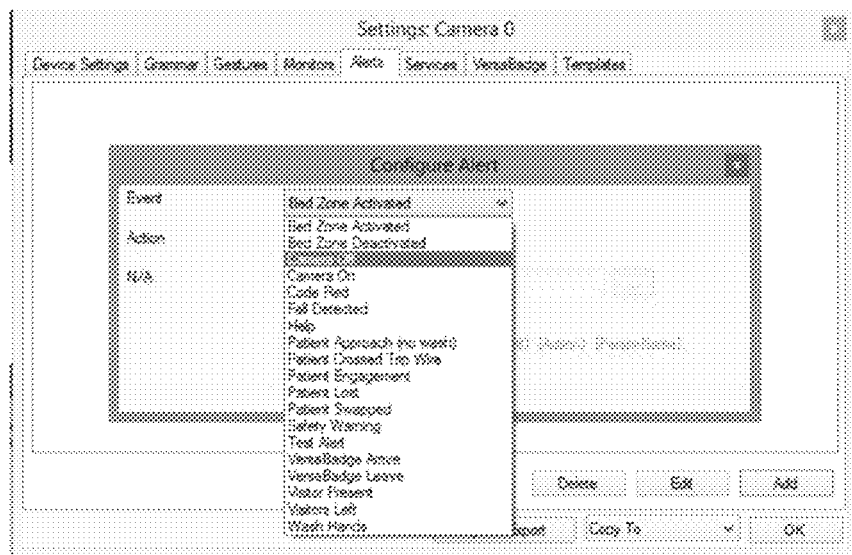

As seen in FIG. 10, for one non-limiting way to configure a new Alert, the user can select the Alerts tabs and then click on or otherwise select the Add button, which can result in the Configure Alert box appearing on the screen (See FIG. 11). As seen in FIG. 11, under the Event field, the user can then select the event from the drop down list that they wish the user wishes to send an alert on.

Figure 12:
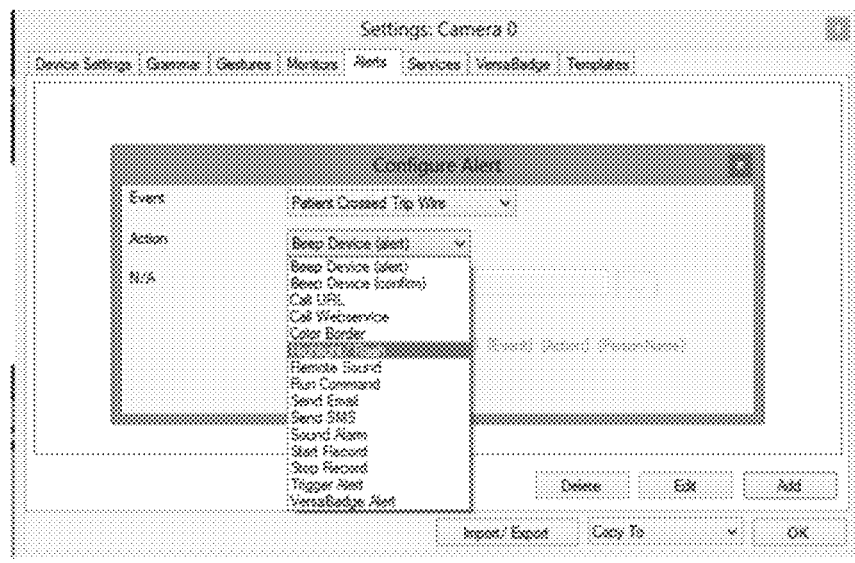
Figure 13:
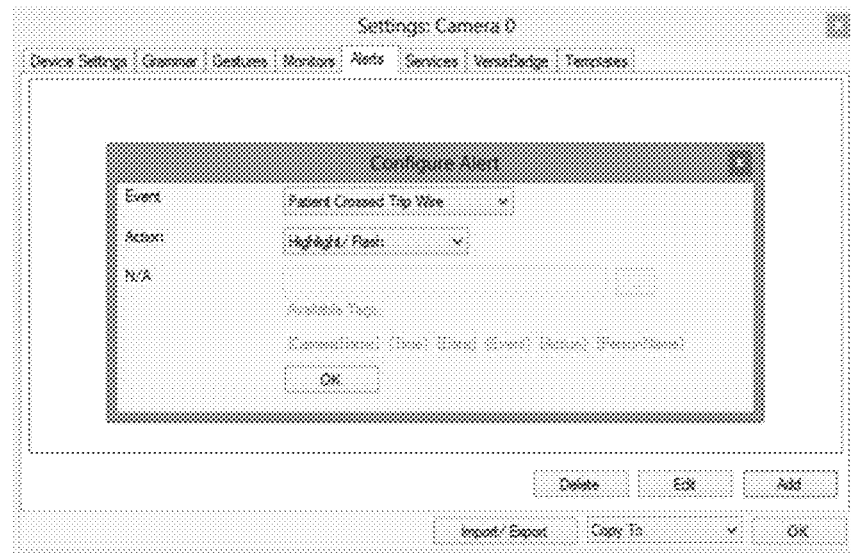
Figure 14:
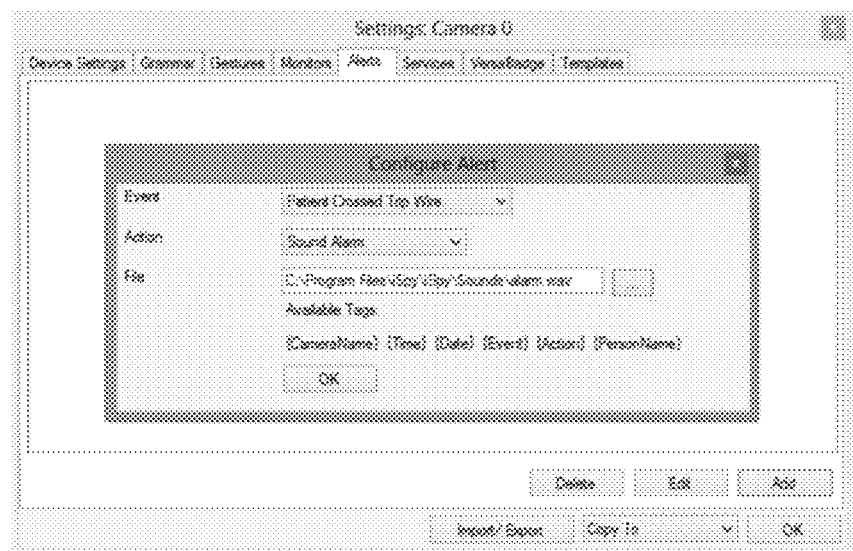
Figure 15:
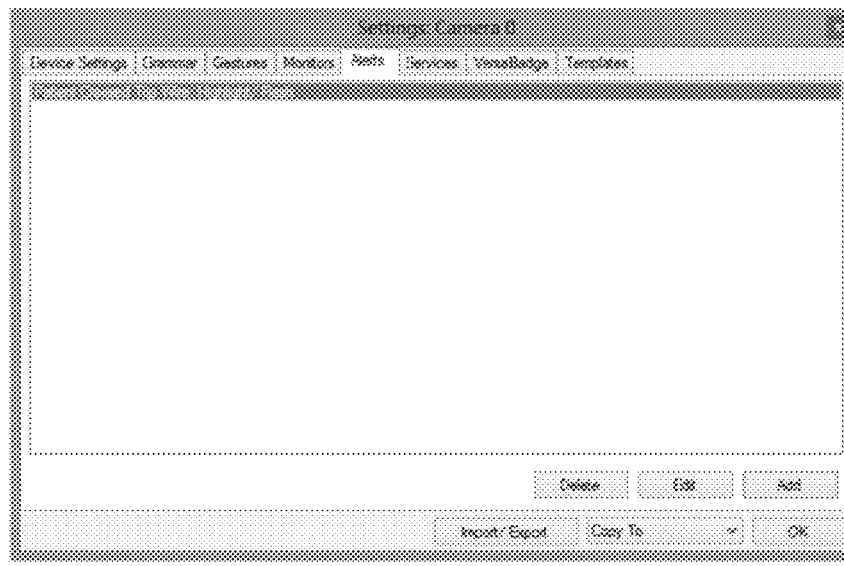

As seen in FIG. 12, once the Event type is selected, under the Action field, the user can select the Action he or she wishes to have the system perform when the selected Event is detected. Once the Event and Action have be selected the OK button (See FIG. 13) is can be selected to save the selected entries.

For certain Actions an additional field may need to be completed to finish the Action. If the field is required, it can appear below the Action dropdown (See FIG. 14). If no further fields are required, the Configure Alert box can display N/A (See FIG. 13) or just be blank. As mentioned above, once all settings are selected, the user clicks or otherwise selects the OK button, which causes the new Alert to be listed in the Alerts tab window. To edit an existing Alert, the user first clicks on or otherwise selects the Alert and then selects the Edit button (See FIG. 15). To delete an Alert, first highlight it can then click on the Delete button (See FIG. 15).

To add more Alerts, the user clicks or selects the Add button and repeats the above described steps. Once finished, the user clicks on or otherwise selects the bottom corner OK button to save and close the window.

FIG. 16 illustrates a screen shot showing a representation of the centralized monitoring station with primary and alert displays. Preferably, the primary display always shows the patient's rooms being monitored and when one room alerts, it shows as a red bar on the primary display and then can enlarge the alerting camera to the second alert display monitor.

The above described system uses several components, including, but not limited to:
1. One or more 3D Motion and Sound Sensors. However, it also within the scope of the invention to eliminate the sound sensor and have the functions of the invention be performed with only motion sensors;
2. Computerized Monitoring System in electronic communication with the one or more 3D Motion and Sound Sensors.
3. Computerized Communication System in electronic communication with the Computerized Monitoring System;
4. Centralized Monitoring Station in electronic communication with one or more 3D Motion and Sound Sensors, Computerized Monitoring and Computerized Communication Systems;
5. Centralized Monitoring Primary Display in electronic communication with one or more Centralized Monitoring Stations; and/or
6. Centralized Monitoring Alert Display in electronic communication with one or more Centralized Monitoring Stations.

The automatic detection and confirmation of a falling incident for an individual will provide significant administrative and clinical benefits and advantages to caregivers and individuals alike, including, but not limited to, the following public benefits:
1. Automation of fall detection and notification of caregivers or other designated entities.
2. Reduction in response time to attend to individuals who have fallen and require assistance.
3. Increased survival rate for individuals who have experienced a fall
4. Reduction in costs for hospitalization and medical care related to complications from a fall All components of the present invention system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the invention.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A method for detecting when a monitored individual has fallen within a fall zone, said method comprising the steps of, at a computerized monitoring system:
   (a) configuring a virtual fall zone within an area that an individual to be monitored is located;
   (b) accessing one or more 3D motion and sound sensors to capture live video data from the area, the one or more 3D motion and sound sensors being programmed to lock on the monitored individual based on 3D coordinates of the individual to be monitored;
   (c) receiving the video data from the one or more 3D motion and sound sensors;
   (d) determining when the monitored individual has become at least partially located within the virtual fall zone; and
   (e) electronically transmitting an alert to a centralized monitoring system when the computerized monitoring system determines that the monitored individual has become at least partially located within the virtual fall zone.

2. The method for detecting of claim 1 further comprising the step of determining whether the monitored individual remained at least partially within the virtual fall zone for a predetermined period of time before electronically transmitting an alert to the centralized monitoring system.

3. The method for detecting of claim 1 further comprising the step of continuously displaying a live video feed of the monitored area received from the one or more 3D motion and sound sensors on a centralized monitoring primary display that is remotely located from the monitored area.

4. The method for detecting of claim 1 further comprising the step of continuously displaying a live video feed of the monitored area received from the one or more 3D motion and sound sensors on a centralized monitoring alert display after it has been determined that the monitored individual is at least partially disposed within the virtual fall zone.

5. The method for detecting of claim 3 further comprising the step of continuously displaying a live video feed of the monitored area received from the one or more 3D motion and sound sensors on a centralized monitoring alert display after it has been determined that that the monitored individual is at least partially disposed within the virtual fall zone, wherein the centralized monitoring alert display is a separate display from the centralized monitoring primary display.

6. The method for detecting of claim 2 further comprising the step of continuously displaying a live video feed of the monitored area received from the one or more 3D motion and sound sensors on a centralized monitoring alert display after it has been determined that the monitored individual is at least partially disposed within the virtual fall zone for the predetermined period of time.

7. The method for detecting of claim 1 further comprising the step of updating a database in communication with the computerized monitoring system regarding the determination that the monitored individual was at least partially located within the virtual fall zone.

8. The method for detecting of claim 1 further comprising the step of notifying a previously designated caregiver by electronic message regarding the determination that the monitored individual was at least partially located within the virtual fall zone.

9. The method for detecting of claim 1 wherein step (a) comprises the steps of:
   receiving a selection of a fall zone from a choice of icons appearing on a screen of a display where the live video feed from the one or more 3D motion and sound sensors is visible on the screen;
   receiving an indication to create an end point where the fall zone begins from a selection on the screen by an electronic cursor;
   receiving a selection of a corner point for the fall zone from the electronic cursor selecting the corner point on the screen;
   receiving selections for remaining corner points for the fall zone and receiving an indication to complete the virtual fall zone from selections on the screen by the electronic cursor.

10. The method for detecting of claim 9 further comprising the step of displaying a depth range box.

11. The method for detecting of claim 10 wherein the depth range box is displayed on the screen within a portion of the completed virtual fall zone.

12. The method for detecting of claim 1 further comprising the step of configuring the type of alert or alarm to generate in the event that it is determined that the individual is at least partially located within the virtual fall zone.

13. The method for detecting of claim 1 wherein the one or more 3D motion and sound sensors are programmed to provide data to the computerized monitoring system representing 3D coordinates of body joints for the monitored individual and a general skeletal outline of the monitored individual.

14. The method for detecting of claim 13 wherein the computerized monitoring system determines if the monitored individual has fallen by determining a location of one or more specific body segments of the monitored individual is within the virtual fall zone.

15. A method for detecting when a monitored individual has fallen within a fall zone, said method comprising the steps of, at a computerized monitoring system:
   (a) configuring a virtual fall zone within an area that an individual to be monitored is located;
   (b) accessing one or more 3D motion and sound sensors to capture live video data from the area, the one or more 3D motion and sound sensors being programmed to lock on the individual to be monitored based on 3D coordinates of the individual to be monitored;
   (c) receiving the video data by the one or more 3D motion and sound sensors;
   (d) determining when the monitored individual has become at least partially located within the virtual fall zone;
   (e) determining whether the monitored individual remains at least partially within the virtual fall zone for a predetermined period of time; and
   (f) electronically transmitting an alert to a centralized monitoring system when the computerized monitoring system determines that the monitored individual remains at least partially located within the virtual fall zone for at least the predetermined period of time.

16. The method for detecting of claim 15 further comprising the step of continuously displaying a live video feed of the monitored area received from the one or more 3D motion and sound sensors on a centralized monitoring primary display that is remotely located from the monitored area.

17. The method for detecting of claim 15 further comprising the step of continuously displaying a live video feed of the monitored area received from the one or more 3D motion and sound sensors on a centralized monitoring alert display after it has been determined that the monitored individual is at least partially disposed within the virtual fall zone for at least the predetermined period of time.

18. The method for detecting of claim 15 further comprising the step of notifying a previously designated caregiver by electronic message regarding the determination that the monitored individual was at least partially located within the virtual fall zone for at least the predetermined period of time.

19. A method for detecting when a monitored individual has fallen within a fall zone, said method comprising the steps of, at a computerized monitoring system:
   (a) configuring a virtual fall zone within an area that an individual to be monitored is located;
   (b) accessing one or more 3D motion and sound sensors to continuously capture live video data from the area, wherein the one or more 3D motion and sound sensors are programmed to lock on the monitored individual and provide data to the computerized monitoring system representing 3D coordinates of body joints for the monitored individual and a general skeletal outline of the monitored individual;
   (c) receiving the video data from the one or more 3D motion and sound;
   (d) determining when the monitored individual has become at least partially located within the virtual fall zone by a location of one or more specific body segments of the monitored individual being located in the virtual fall zone;
   (e) determining whether the one or more specific body segments of the monitored individual remain within the virtual fall zone for a predetermined period of time; and
   (f) electronically transmitting an alert to a centralized monitoring system when the computerized monitoring system determines that the monitored individual remains at least partially located within the virtual fall zone for at least the predetermined period of time.

20. The method for detecting of claim 19 further comprising the steps of:
   continuously displaying a live video feed of the monitored area received from the one or more 3D motion and sound sensors on a centralized monitoring primary display that is remotely located from the monitored area; and
   continuously displaying a live video feed of the monitored area received from the one or more 3D motion and sound sensors on a centralized monitoring alert display after it has been determined that the monitored individual is at least partially disposed within the virtual fall zone for at least the predetermined period of time, wherein the centralized monitoring alert display is a separate display from the centralized monitoring primary display.

* * * * *

UNITED STATES PATENT AND TRADEMARK OFFICE
CERTIFICATE OF CORRECTION

PATENT NO. : 10,096,223 B1
APPLICATION NO. : 14/575850
DATED : October 9, 2018
INVENTOR(S) : Neil Kusens Page 1 of 1

It is certified that error appears in the above-identified patent and that said Letters Patent is hereby corrected as shown below:

On the Title Page

Item (73) Assignee: Please remove "Cerner Innovication, Inc." and replace with --Cerner Innovation, Inc.--.

In the Specification

Column 2, Line 49: Please remove "room, it" and replace with --room. It--.
Column 2, Line 53: Please remove "sensor," and replace with --sensor.--.
Column 2, Line 66: Please remove "and or" and replace with --and/or--.
Column 3, Line 15: Please remove "-living" and replace with --living--.
Column 3, Line 24: Please remove "though" and replace with --through--.
Column 3, Line 67: Please remove "room" and replace with --room,--.
Column 5, Line 4: Please remove "audio" and replace with --audio,--.
Column 5, Line 40: Please remove "then" and replace with --than--.
Column 7, Line 23: Please remove "Sensors." and replace with --Sensors;--.
Column 7, Line 36: Below "Stations." Please insert --The various components can be in electrical, wired and wireless communication with each other.--.
Column 7, Line 47: Please remove "fall" and replace with --fall.--.
Column 7, Line 49: Please remove "fall" and replace with --fall.--.
Column 8, Line 60: Please remove "that that" and replace with --that--.

Signed and Sealed this
Twenty-seventh Day of November, 2018

Andrei Iancu
*Director of the United States Patent and Trademark Office*